(12) United States Patent
Zoppas et al.

(10) Patent No.: US 10,647,464 B2
(45) Date of Patent: May 12, 2020

(54) THERMOPLASTIC PREFORM FOR A WIDE-MOUTH CONTAINER

(71) Applicant: S.I.P.A. Societa' Industrializzazione Progettazione E Automazione S.P.A., Vittorio Veneto (IT)

(72) Inventors: Matteo Zoppas, Conegliano (IT); Mauro Manunta, Porcia (IT); Dino Enrico Zanette, Godega di Sant'Urbano (IT)

(73) Assignee: S.I.P.A. Societa' Industrializzazione Progettazione E Automazione S.P.A., Vittoro Veneto (IT)

( * ) Notice: Subject to any disclaimer, the term of this patent is extended or adjusted under 35 U.S.C. 154(b) by 164 days.

(21) Appl. No.: 15/524,958

(22) PCT Filed: Nov. 9, 2015

(86) PCT No.: PCT/IB2015/058644
§ 371 (c)(1),
(2) Date: May 5, 2017

(87) PCT Pub. No.: WO2016/071889
PCT Pub. Date: May 12, 2016

(65) Prior Publication Data
US 2017/0320610 A1    Nov. 9, 2017

(30) Foreign Application Priority Data
Nov. 7, 2014  (IT) .............. RM2014A0653

(51) Int. Cl.
*B65D 1/02*     (2006.01)
*B29B 11/14*   (2006.01)
*B29L 31/00*   (2006.01)

(52) U.S. Cl.
CPC .............. *B65D 1/023* (2013.01); *B29B 11/14* (2013.01); *B29B 2911/1458* (2013.01);
(Continued)

(58) Field of Classification Search
CPC . B65D 1/023; B29B 11/14; B29B 2911/1458; B29B 2911/14666;
(Continued)

(56) References Cited

U.S. PATENT DOCUMENTS 5,122,325 A    6/1992  Bartley et al.
5,217,128 A    6/1993  Stenger
(Continued)

FOREIGN PATENT DOCUMENTS

JP    2002284132    10/2002
WO    WO2011148879    1/2011

*Primary Examiner* — Michael C Miggins
(74) *Attorney, Agent, or Firm* — Stetina Brunda Garred & Brucker (57) ABSTRACT

An innovative neck (301) configuration is suggested in order to reduce the weight of a large container for beverage dispenser. The neck (301) comprises a neck finish (303) which extends in length (Ltot) starting from the wide mouth (302) of the container to an annular support ring (305) and a smooth surface cylindrical portion (306) which joins the annular support ring (305) to the body (309) of the container. For functional reasons, the total length (Ltot) of the innovative neck (301) remains the same as the usual traditional necks for this type of container, but due to the short length (Ltot) of the neck finish (303) and said cylindrical portion (306), the weight is reduced.

10 Claims, 6 Drawing Sheets

(52) U.S. Cl.
CPC ............... *B29B 2911/1498* (2013.01); *B29B 2911/14666* (2013.01); *B29B 2911/14726* (2013.01); *B29L 2031/716* (2013.01); *B29L 2031/7158* (2013.01)

(58) Field of Classification Search
CPC ... B29B 2911/14726; B29B 2911/1498; B29L 2031/7158; B29L 2031/716
See application file for complete search history.

(56) References Cited

U.S. PATENT DOCUMENTS

| | | |
|---|---|---|
| 5,888,598 A | 3/1999 | Brewster et al. |
| 6,939,498 B2 | 9/2005 | Wong |
| 9,238,341 B2 | 1/2016 | Tsuchiya |
| 2006/0204694 A1 | 9/2006 | Porter et al. |
| 2007/0108232 A1 | 5/2007 | Loebach |
| 2011/0225934 A1 | 9/2011 | Drenguis |

THERMOPLASTIC PREFORM FOR A WIDE-MOUTH CONTAINER

CROSS REFERENCE TO RELATED APPLICATIONS

The present application claims priority to PCT International Application No. PCT/IB2015/058644 filed on Nov. 9, 2015, which application claims priority to Italian Patent Application No. RM2014A0000653 filed Nov. 7, 2014, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The invention relates to a neck for plastic containers, in particular made of PET, for containing beverages and adapted to be inserted and used in beverage dispensers.

BACKGROUND ART

Cool water dispensers are familiar items in offices and factories and provide a convenient and readily available source of drinking water. Water dispensers generally utilize returnable or single use water containers made of synthetic polymeric material, such as polycarbonate, PET, etc.

PET containers have the advantage of being relatively light compared with other materials and are producible in large quantities by a process of blow molding. Respecting the environment requires reducing the weight especially of the single use containers. Furthermore, PET is also a relatively expensive material, thus the development of containers which are as light as possible is very important. With the lightening of these containers there is always the issue of the vacuum created during the drawing of the water. Typically, these containers must resist to a maximum vacuum pressure in the range of 50 mbar to 75 mbar. The resistance to this vacuum pressure is given by various factors, such as material distribution, weight, shape, ribs and design of the container. Therefore, the lightening of these containers is pushing companies to broaden their view to find new solutions. The need to limit the amount of PET leads to the development of containers with structures which are able to adequately compensate for the fragility due to the thinness of the walls. It is evident that it is not easy to have containers of this type with very thin walls. Instead of working on thinning the walls, or in addition to that, another idea is to consider the neck of the large-sized containers. Usually, these containers have the typical 55 millimeter neck finish which has a weight of approximately 34-38 grams. Furthermore, the length of the neck must be kept at a given value in order to be able to position it on a conventional type dispenser with which the water can be drawn. These large water containers, when inserted in the dispenser, are turned upside-down and positioned with the neck downwards in a funnel at the top of the dispenser. Thus, the need is felt to find a way to reduce the amount of material used for the neck, yet maintaining its functionality at the same time.

Document US2011/0225934 describes a plastic bottle the neck of which is not provided with the typical support ring, also known as "neck ring", which is used for handling the bottle and/or the preform from which the bottle is obtained. Instead, the bottle and the preform described in this document use the fixing ring for handling the preform and/or the bottle. However, such a configuration requires specific handling means, disadvantageously forcing to adapt the existing handling systems.

Document US2006/0204694 describes a bottle and a preform with a specific neck configuration in which the support ring is relatively distant from the opening of the neck. Furthermore, this type of neck does not include additional rings and, as a whole, is not a neck designed to be particularly light.

Such known configurations are not suited to provide a neck of a container, in particular of a large size bottle for water dispensers, with a lighter neck.

BRIEF DESCRIPTION OF THE INVENTION

It is thus the object of the present invention to provide a preform for constructing a large volume thermoplastic material container, e.g. made of PET, for a water dispenser, which is lighter than the known containers. The solution to the problem is provided by an innovative neck configuration which allows to save material for its implementation. Thus, the present invention suggests to reach the object described above by means of a thermoplastic preform configured to obtain by means of a blowing process a wide-mouth container suited for use in a beverage dispenser, wherein the preform defines an axis X and comprises a neck and a body coaxial to axis X, wherein the neck has an inner cylindrical surface adapted to remain unchanged in said blowing process and having a total length Ltot along axis X, while the body is adapted to be blown in said blowing process to take the shape of said container, said neck comprising a neck finish provided with the opening for pouring the beverage, and having a first axial length L1, which is part of said total length Ltot a support ring, a cylindrical portion having a second axial length L2, which is part of said total length Ltot, wherein the support ring is arranged between the neck finish and the cylindrical portion, wherein the cylindrical portion is arranged between the body and the support ring, and wherein said second axial length L2 is at least equal to said first axial length L1.

Preferably, the inner cylindrical surface of the neck has no uneven parts.

Preferably, a container according to the invention has a capacity comprised between 5 and 30 liters, for example between 10 and 20 liters.

The neck of the preform and of the container which can be obtained from the preform are at least partially identical to each other. Indeed, the neck of the preform has at least one axial length portion Ltot which is not subject to blowing and thus maintains its initial shape also at the end of the blowing process.

BRIEF DESCRIPTION OF THE FIGURES

Further features and advantages of the invention will become more apparent in light of the detailed description of a preferred, but not exclusive embodiment of a PET preform and of a container for a water dispenser illustrated by way of non-limiting example, with the aid of the following figures, in which.

DETAILED DESCRIPTION OF PREFERRED EMBODIMENTS OF THE INVENTION

The present invention relates to a thermoplastic material preform, e.g. made of PET, having an innovative neck configuration which has a much lighter construction than the necks of the prior art. The invention also relates to a container for water dispensers obtained from such a preform by means of a process of blow molding.

Figure 1:
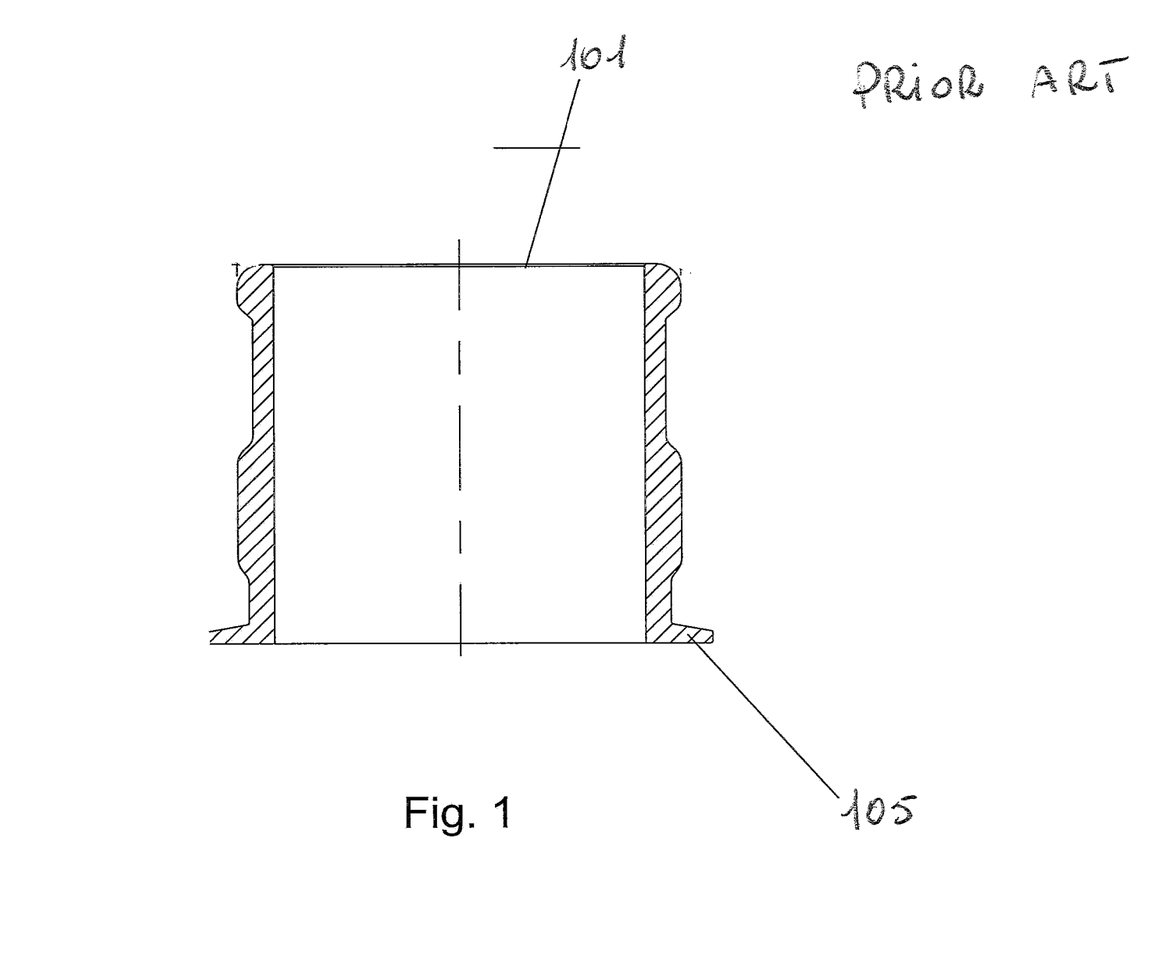
FIG. 1 shows a neck of the prior art.

In order to appreciate better the advantages of the invention, FIG. 1, which illustrates a neck finish 102 according to the prior art, is provided for the purposes of comparison. The height or axial length of the neck finish 102 with traditional outer diameter of 55 millimeters from the wide-mouth opening 101 to the support or neck ring 105 is approximately 47 millimeters and the weight is approximately 34-38 grams. "Neck finish" means the portion comprised between a plane defined by the neck opening 101 and a plane defined by the base of the support ring 105. On the axial length of the neck finish 102 ridges are distributed to allow to close the container by means of a cap and support it along the conveyor belt and when it is in the mold. The neck finish 102 is the non-stretched area during the blow molding process and typically has standard overall dimensions, with particular reference to the diameter and the axial length.

The idea underlying the present invention is to position the support ring in innovative manner, thus contributing to reducing the total length of the neck, and its weight as a consequence, in considerable manner. As previously mentioned, the height of the neck is preferably maintained at a given value for functional purposes.

Figure 2A:
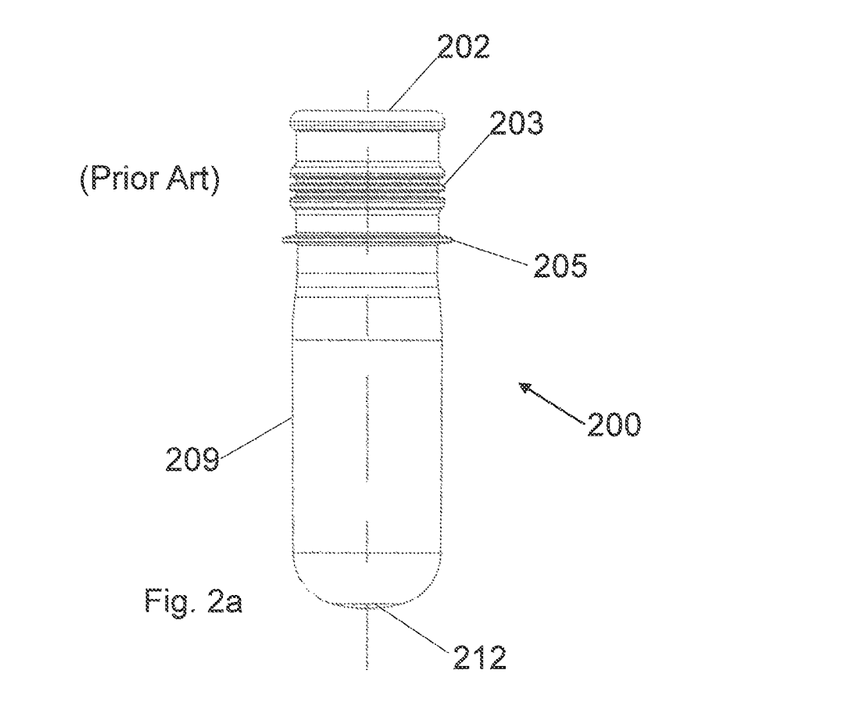
FIGS. 2a and 2b shows a comparison between a preform of the prior art (FIG. 2a) and a preform according to a first variant of the present invention (FIG. 2b)

The configuration of the innovative neck will be described in greater detail in FIG. 2. FIG. 2a shows a preform 200 according to the prior art. The preform 200 comprises a neck finish 203, with maximum outer diameter equal to approximately 55 millimeters, which along longitudinal axis of the preform measures approximately 47 millimeters from the mouth 202 to the support ring 205. The preform 200 also comprises a body 209 which extends from the support ring 205 to the bottom 212 and is the part of the preform which will be blown to have the shape of the container.

Figure 2B:
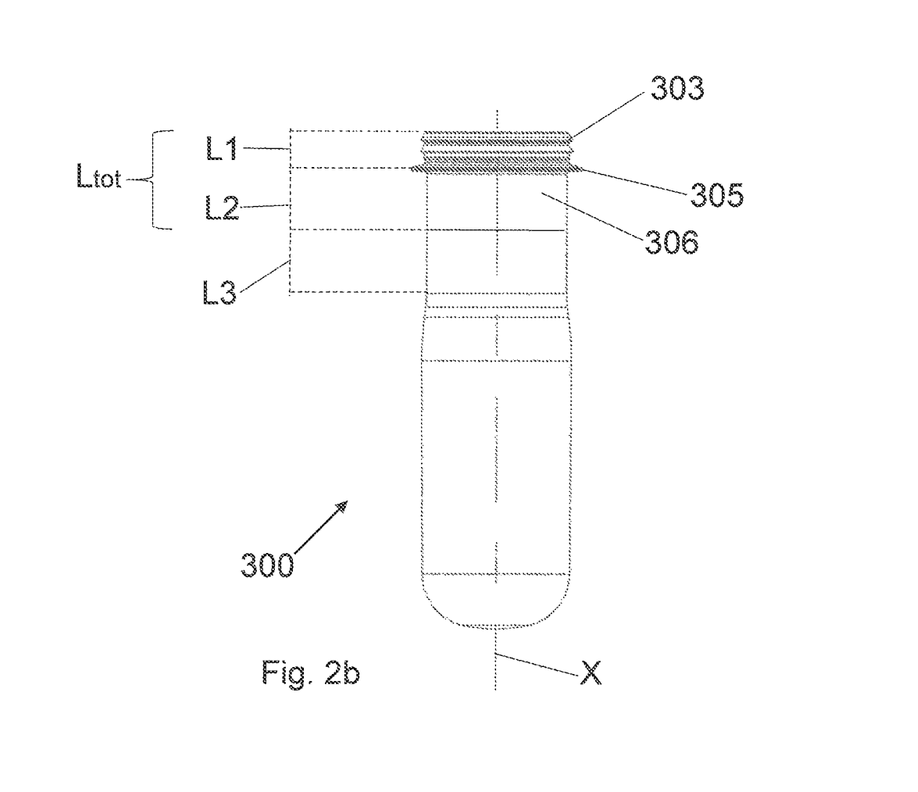

FIG. 2b shows a preform 300 according to the invention. The preform defines an axis X and comprises a neck 301 which has a first inner cylindrical surface adapted to remain unchanged in said blowing process and having a total length Ltot along axis X.

In the embodiment in FIG. 2b, immediately under said first inner cylindrical surface of length Ltot a second inner cylindrical surface of axial length L3 is also provided, which is instead adapted to expand by means of blowing defining a connection stretch between the body 309 and the part of the neck of length Ltot which is not deformed due to blowing.

The neck 301 comprises:
a neck finish 303 provided with the opening 302 for pouring the beverage, and having a first axial length L1, which is part of said total length Ltot,
a support ring 305,
a cylindrical portion 306 having a second axial length L2, which is part of said total length Ltot, wherein the support ring 305 is arranged between the neck finish 303 and the cylindrical portion 306, wherein the cylindrical portion 306 is arranged between the body 309 and the support ring 305, and wherein said second axial length L2 is at least equal to said first axial length L1.

Figure 3:
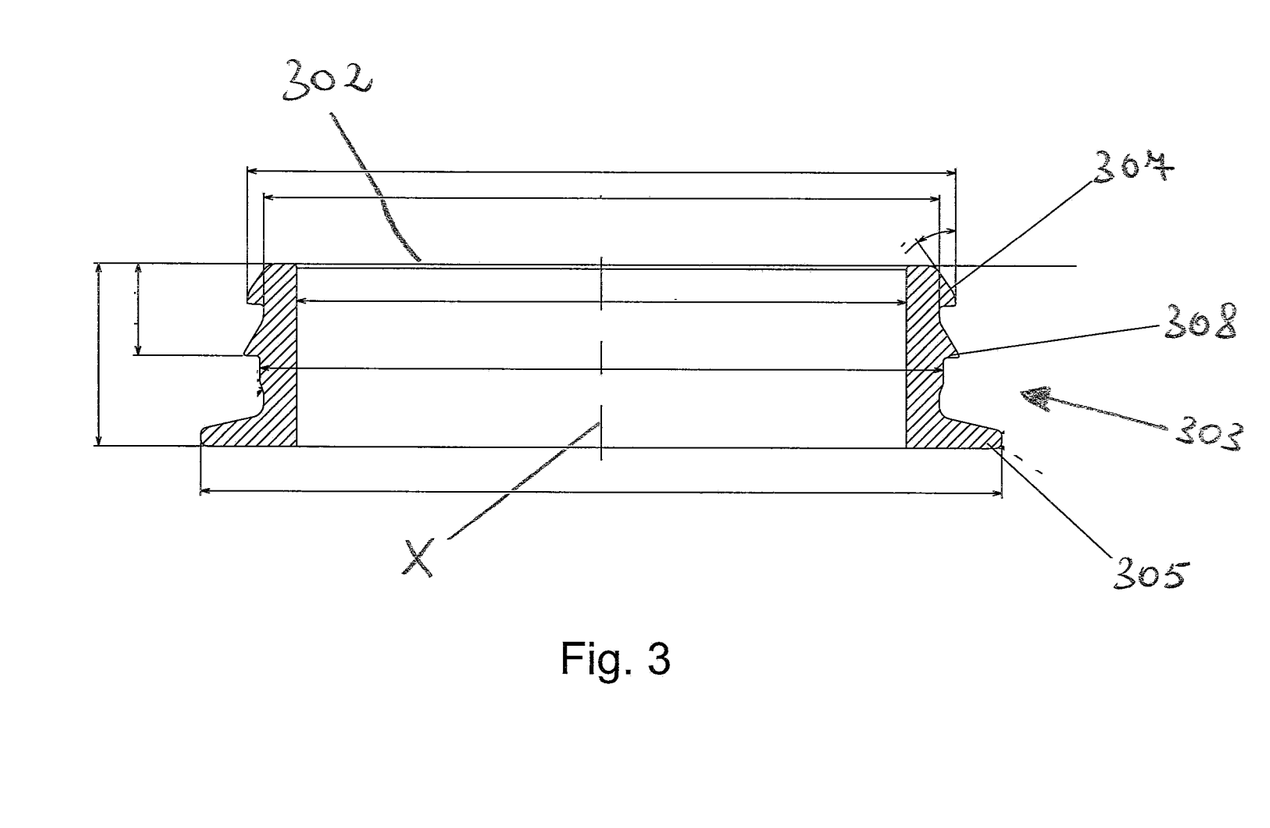
FIG. 3 shows a neck finish according to the present invention.

The neck finish 303 according to the invention is shown in FIG. 3, in which the support ring 305 is also shown.

The inner cylindrical surface of the neck finish 303 is smooth and without protuberances and recesses.

The neck finish 303 has two annular ridges, an upper ridge 307 near the wide-mouth opening 302 and a lower ridge 308 proximal to the support ring 305.

When observed in a cross section comprising the longitudinal axis X, the profile of the upper ridge 307 has a trapezoidal shape, preferably with two sides parallel to the longitudinal axis, one side along the outer cylindrical surface of the neck finish and the opposite side which forms the outermost part of the upper ridge 307. The upper side is inclined by a 35° angle, starting from the edge of the wide-mouth opening and ending with the outer side of the trapezium. The side opposite to the inclined one is perpendicular to the outer cylindrical surface of the neck finish. The lower ridge 308 has a triangular profile instead. The outer surface of the part of the neck finish 303, arranged under of the lower ridge 308 and over the support ring 305, is substantially smooth and without protuberances. The length L1 of the neck finish 303 is approximately 12-15 millimeters, e.g. 14 millimeters, and is the sum of the length of a first part comprising the two ridges 307, 308 and of a second part arranged under the lower ridge 308 and over the support ring 305. The inner diameter of the wide-mouth opening is approximately 44-48 millimeters, e.g. 46.5 millimeters, while the maximum outer diameter is approximately 53-58 millimeters, e.g. 54 millimeters. The outer diameter of the support ring is approximately 60-62 millimeters. The height of the traditional 55 millimeters neck finish (prior art) is approximately 47 millimeters with a weight of 34-38 grams, while the neck finish of the 55 millimeters neck of the invention is 14 millimeters with a weight of 10-11 grams. If the height of the traditional 55 millimeters neck finish is considered, i.e. if the total height of the neck according to the invention also comprising the cylindrical amount of material under the neck support ring is considered, there is still a weight reduction of approximately 10 grams.

This innovative 55 millimeters neck finish is configured for a snap cap, thus the capping machines currently in use can still be utilized. The innovative neck finish is more compact while having the same functional aspects as the traditional neck finish.

Another advantage of this innovative neck finish is that it requires a smaller 55 millimeters snap cap, which is another positive aspect which is respectful of the environment.

Figure 4:
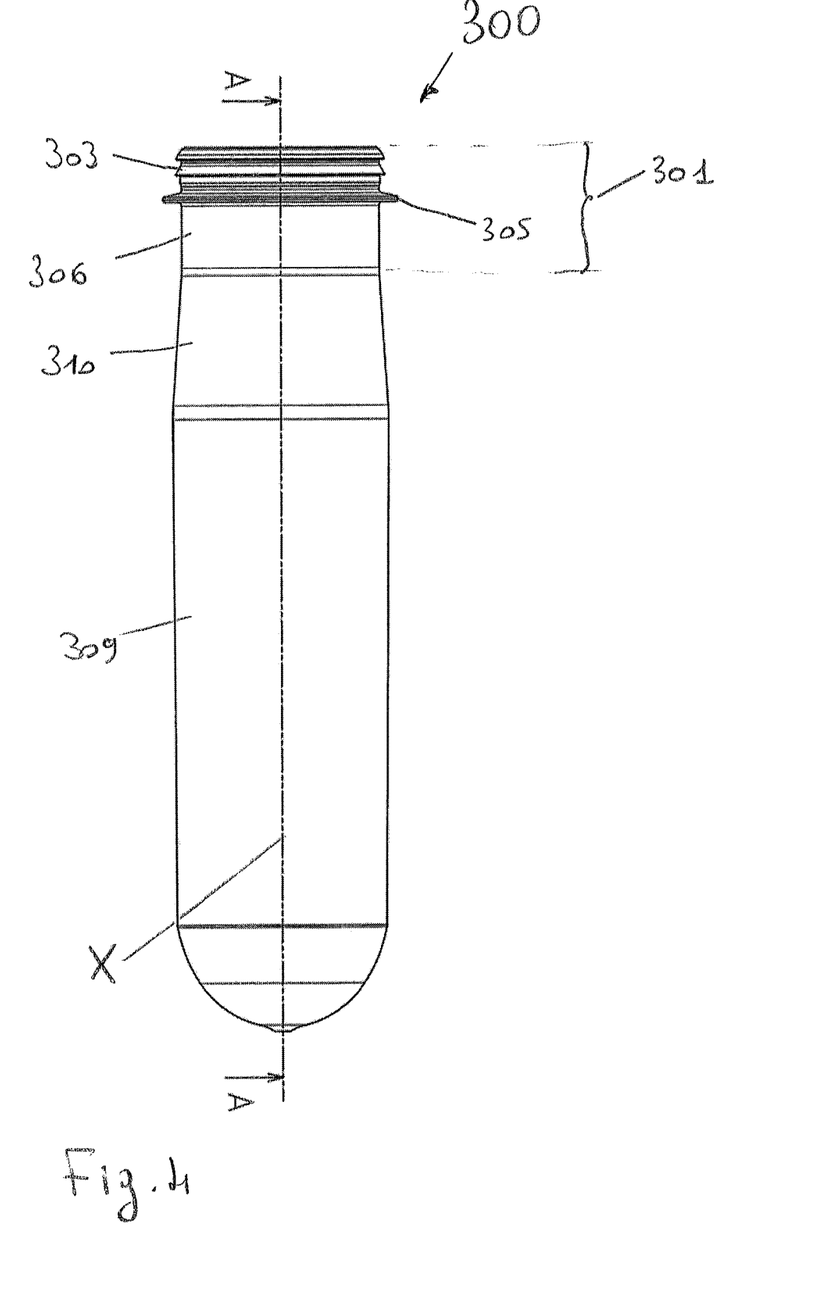
FIG. 4 shows a front view of a preform according to a second variant of the present invention.
Figure 5:
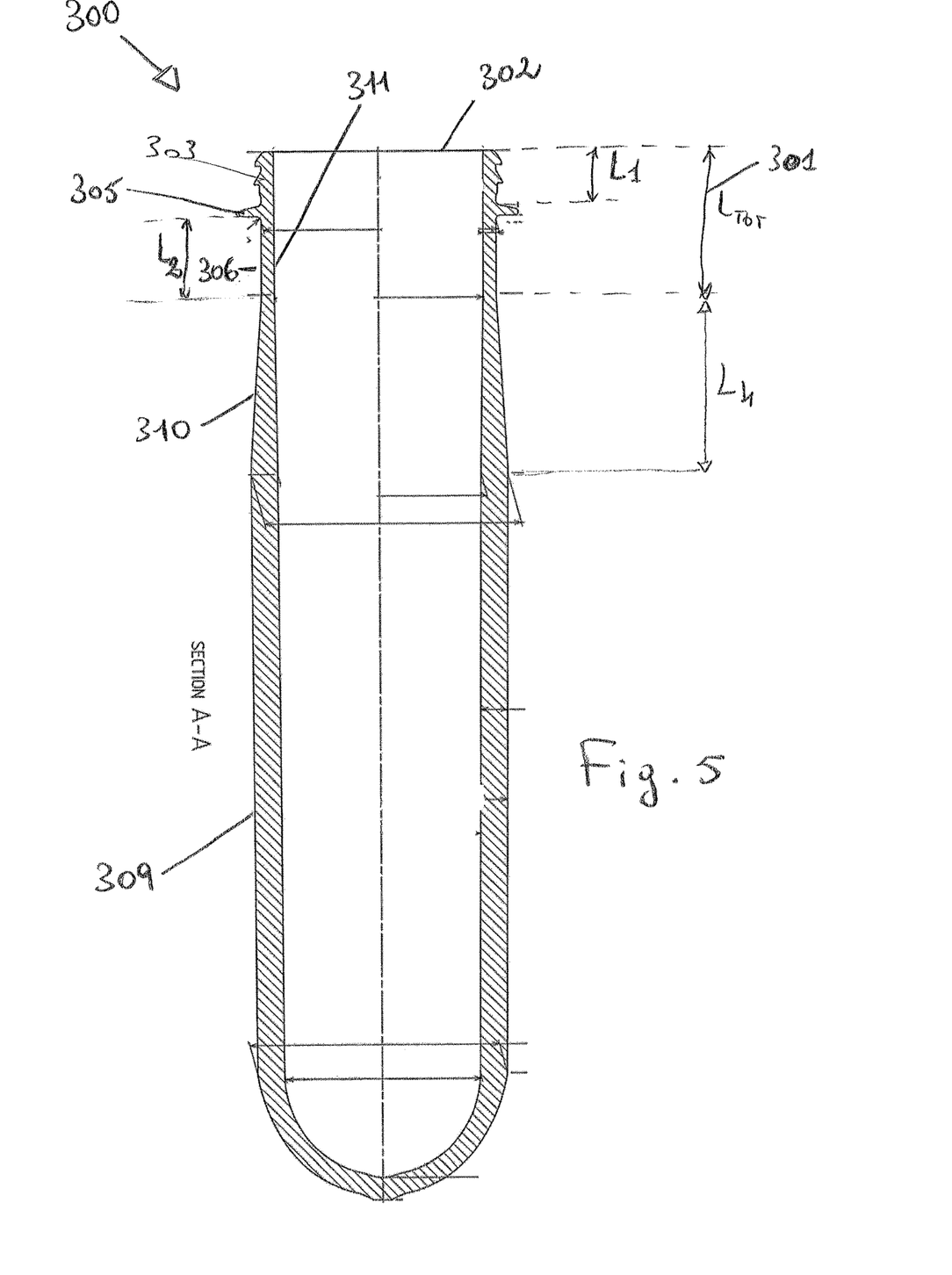
FIG. 5 shows a longitudinal section of the preform in FIG. 4.

A second embodiment of the preform of the invention is shown in FIGS. 4 and 5. The preform 300 defines an axis X and comprises a neck 301 which has an inner cylindrical surface 311 adapted to remain unchanged in said blowing process and having a total length Ltot along axis X.

In this embodiment, immediately under the neck 301 of length Ltot a transition zone 310 is also provided of axial length IA, which is instead adapted to expand by means of blowing defining a connection stretch between the body 309 and the neck 301 of length Ltot which is not deformed due to blowing. The transition zone 310 has an inner cylindrical surface of diameter equal to the inner cylindrical surface 311, while its outer surface is a truncated cone surface tapered towards the support ring 305.

The neck 301 comprises:
- a neck finish 303 provided with the opening 302 for pouring the beverage, and having a first axial length L1, which is part of said total length Ltot,
- a support ring 305,
- a cylindrical portion 306 having a second axial length L2, which is part of said total length Ltot, wherein the support ring 305 is arranged between the neck finish 303 and the cylindrical portion 306, wherein the cylindrical portion 306 is arranged between the body 309 and the support ring 305, preferably between the transition zone 310 and the support ring 305, and wherein said second axial length L2 is at least equal to said first axial length L1.

The inner cylindrical surface of the neck finish 303 is smooth and without from protuberances and recesses.

The neck finish 303 has two annular ridges, an upper ridge 307 near the wide-mouth opening 302 and a lower ridge 308 proximal to the support ring 305.

Figure 6:
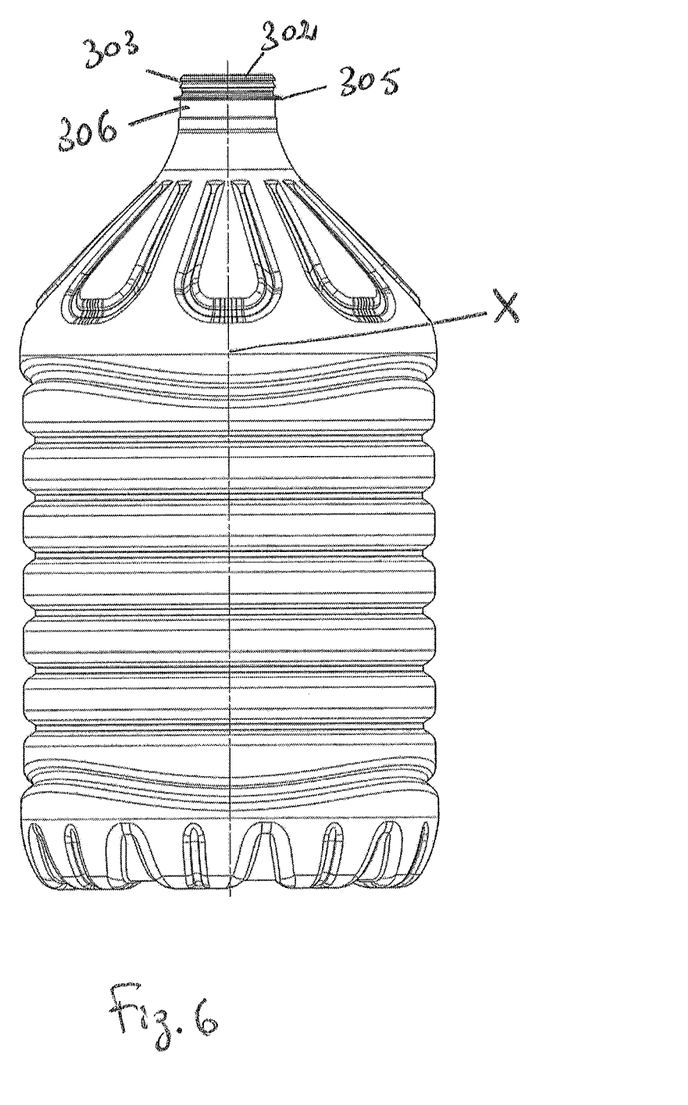
FIG. 6 shows a front view of a container obtained starting from the preform of FIG. 4.

FIG. 6 shows an example of a container blown from the preform of FIG. 4, having a volume comprised between 5 liters and 30 liters, preferably between 10 and 20 liters.

In both embodiments described above:
- said second axial length L2 is from 1.2 to 3 times greater than said first axial length L1;
- said first axial length L1 is comprised between 12 and 15 millimeters;
- the weight of the neck finish 303 is comprised between 9 and 12 grams;
- the weight of the neck 301 is comprised between 20 and 28 grams;
- the diameter of the mouth is comprised between 53 and 58 millimeters. "Neck finish" 303 of the neck means the portion comprised between a plane defined by the neck opening 302 and a plane defined by the base of the support ring 305.

The invention was presented by describing a specific embodiment. It is apparent that changes are possible without departing from the spirit of the invention, i.e. a neck for a large container comprising a shorter neck finish near the wide-mouth opening and ending with a support ring and a smooth surface cylindrical part which joins the support ring to the container body.

By maintaining the same inner diameter, the innovative neck finish does not require to make changes to the filling line.

The invention claimed is:

1. A thermoplastic preform configured to obtain by means of a blowing process a wide-mouth container suitable for use in a beverage dispenser,
wherein the thermoplastic preform defines an axis X and comprises a neck and a body coaxial to axis X,
wherein the neck has an inner cylindrical surface adapted to remain unchanged in said blowing process and having a total length Ltot along axis X, the body being adapted to be blown in said blowing process to take a shape of said wide-mouth container,
said neck comprising
a support ring;
a neck finish extending from the support ring to an opening for pouring a beverage, and having a first axial length L1, which is part of said total length Ltot, and
a cylindrical portion having a second axial length L2, which is part of said total length Ltot,
wherein the support ring is arranged between the neck finish and the cylindrical portion,
wherein the cylindrical portion is arranged between the body and the support ring,
wherein said second axial length L2 is at least equal to said first axial length L1, and
wherein said wide-mouth container has a volume comprised between 5 liters and 30 liters.

2. The thermoplastic preform according to claim 1, wherein said second axial length L2 is 1.2 to 3 times greater than said first axial length L1.

3. The thermoplastic preform according to claim 1, wherein said first axial length L1 is comprised between 12 and 15 millimeters.

4. The thermoplastic preform according to claim 1, wherein the neck finish has a weight comprised between 9 and 12 grams.

5. The thermoplastic preform according to claim 1, wherein the neck has a weight between 20 and 28 grams.

6. The thermoplastic preform according to claim 1, wherein the neck has a wide-mouth having an outer diameter comprised between 53 and 58 millimeters.

7. The thermoplastic preform according to claim 1, wherein the neck finish is provided with at least two annular ridges.

8. The thermoplastic preform according to claim 1, wherein the cylindrical portion comprises an outer cylindrical wall and an inner cylindrical wall, which are coaxial to each other.

9. The thermoplastic preform according to claim 8, wherein a surface of the outer cylindrical wall and/or a surface of the inner cylindrical wall is smooth, without protrusions.

10. A wide-mouth container obtained from a preform according to claim 1.

* * * * *